United States Patent
Mantor et al.

(10) Patent No.: US 10,474,468 B2
(45) Date of Patent: Nov. 12, 2019

(54) INDICATING INSTRUCTION SCHEDULING MODE FOR PROCESSING WAVEFRONT PORTIONS

(71) Applicant: Advanced Micro Devices, Inc., Sunnyvale, CA (US)

(72) Inventors: Michael J. Mantor, Orlando, FL (US); Brian D. Emberling, Palo Alto, CA (US); Mark Fowler, Hopkinton, MA (US); Mark M. Leather, Los Gatos, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 100 days.

(21) Appl. No.: 15/439,540

(22) Filed: Feb. 22, 2017

(65) Prior Publication Data

US 2018/0239606 A1    Aug. 23, 2018

(51) Int. Cl.
*G06F 9/38* (2018.01)
*G06T 1/20* (2006.01)
*G06F 9/30* (2018.01)

(52) U.S. Cl.
CPC ........ *G06F 9/3836* (2013.01); *G06F 9/30098* (2013.01); *G06F 9/30189* (2013.01); *G06F 9/3851* (2013.01); *G06F 9/3887* (2013.01); *G06T 1/20* (2013.01)

(58) Field of Classification Search
CPC .... G06F 9/3009; G06F 9/3836; G06F 9/3887; G06F 9/46; G06F 9/50; G06F 15/8007; G06T 1/20
See application file for complete search history.

(56) References Cited

U.S. PATENT DOCUMENTS

| | | | |
|---|---|---|---|
| 7,761,697 B1 | 7/2010 | Coon et al. | |
| 8,151,095 B1* | 4/2012 | Wilt | G06F 9/3851 |
| | | | 712/228 |
| 9,804,666 B2* | 10/2017 | Jiao | G06F 1/3296 |
| 2006/0149941 A1 | 7/2006 | Colavin et al. | |
| 2011/0219221 A1 | 9/2011 | Skadron et al. | |

(Continued)

OTHER PUBLICATIONS

Meng et al., "Dynamic Warp Subdivision for Integrated Branch and Memory Divergence Tolerance", 2010, 12 pages.*

(Continued)

*Primary Examiner* — David J. Huisman
(74) *Attorney, Agent, or Firm* — Meyertons Hood Kivlin Kowert and Goetzel PC; Rory D. Rankin

(57) ABSTRACT

Systems, apparatuses, and methods for processing variable wavefront sizes on a processor are disclosed. In one embodiment, a processor includes at least a scheduler, cache, and multiple execution units. When operating in a first mode, the processor executes the same instruction on multiple portions of a wavefront before proceeding to the next instruction of the shader program. When operating in a second mode, the processor executes a set of instructions on a first portion of a wavefront. In the second mode, when the processor finishes executing the set of instructions on the first portion of the wavefront, the processor executes the set of instructions on a second portion of the wavefront, and so on until all portions of the wavefront have been processed. The processor determines the operating mode based on one or more conditions.

20 Claims, 9 Drawing Sheets

(56) References Cited

U.S. PATENT DOCUMENTS

| | | | |
|---|---|---|---|
| 2012/0089792 A1* | 4/2012 | Fahs | G06F 9/30036 711/154 |
| 2013/0042090 A1* | 2/2013 | Krashinsky | G06F 9/3016 712/214 |
| 2013/0117541 A1 | 5/2013 | Choquette et al. | |
| 2014/0164737 A1 | 6/2014 | Collange et al. | |
| 2014/0215187 A1 | 7/2014 | Yazdani | |
| 2014/0337389 A1 | 11/2014 | Ricketts et al. | |
| 2015/0220346 A1 | 8/2015 | Wang et al. | |
| 2016/0085551 A1* | 3/2016 | Greathouse | G06F 9/3887 712/206 |
| 2016/0103715 A1* | 4/2016 | Sethia | G06F 12/0844 718/106 |
| 2017/0278213 A1* | 9/2017 | Eckert | G06T 1/20 |
| 2018/0046577 A1* | 2/2018 | Chen | G06F 12/0848 |
| 2018/0108109 A1* | 4/2018 | Zhan | G06T 1/20 |

OTHER PUBLICATIONS

Brunie et al., "Simultaneous Branch and Warp Interweaving for Sustained GPU Performance", Jun. 11, 2012, 36 pages.*

Volkov, "Understanding Latency Hiding on GPUs", Aug. 12, 2016, 128 pages.*

European Search Report in European Application No. 17159105.0, dated Sep. 19, 2017, 4 pages.

Communication pursuant to Article 94(3) EPC in European Application No. 17159105.0, dated Nov. 21, 2017, 10 pages.

International Search Report and Written Opinion in International Application No. PCT/US2018/019026, dated May 7, 2018, 9 pages.

Brunie et al., "Simultaneous Branch and Warp Interweaving for Sustained GPU Performance", Proceedings of the 39th Annual International Symposium on Computer Architecture, Jun. 9, 2012, pp. 49-60, https://hal-ens-lyon.archives-ouvertes.fr/ensl-00649650/file/sbiswi.pdf. [Retrieved May 17, 2018].

Fung et al. "Dynamic Warp Formation and Scheduling for Efficient GPU Control Flow", Proceedings of the 40th 4nnual IEEE/ACM International Symposium on Microarchitecture, Dec. 1, 2007, 12 pages, https://www.ece.ubc.ca/~aamodt/papers/wwlfung.micro2007.pdf. [Retrieved May 17, 2018].

Ino et al., "Cooperative Multitasking for GPU-Accelerated Grid Systems", Concurrency and Computation: Practice and Experience, Jan. 2012, pp. 96-107, vol. 24, Issue 1, https://pdfs.semanticscholar.org/6d21/d8bb5419e94c9dfd85c1619b21ec65f93914.pdf. [Retrieved May 17, 2018].

Jog et al., "OWL: Cooperative Thread Array Aware Scheduling Techniques for Improving GPGPU Performance", Proceedings of the 18th International Conference on Architectural Support for Programming Languages and Operating Systems, Mar. 16, 2013, pp. 395-406, http://www.danielwong.org/classes/_media/ee260_w17/owl.pdf. [Retrieved May 17, 2018].

Kulkarni et al., "Scheduling Strategies for Optimistic Parallel Execution of Irregular Programs", Proceedings of the 20th Annual Symposium on Parallelism in Algorithms and Architectures, Jun. 1, 2008, pp. 217-228, https://www.cs.cornell.edu/~kb/publications/SPAA08.pdf. [Retrieved May 17, 2018].

Lee et al., "CAWS: Criticality-Aware Warp Scheduling for GPGPU Workloads", Proceedings of the 23rd International Conference on Parallel Architectures and Compilation, Aug. 24, 2014, pp. 175-186, http://faculty.engineering.asu.edu/carolewu/wp-content/uploads/2012/12/PACT14_CAWS_Lee_final.pdf. [Retrieved May 17, 2018].

"Multi-Process Service", NVIDIA Corporation, Oct. 2017, 28 pages, https://docs.nvidia.com/deploy/pdf/CUDA_Multi_Process_Service_Overview.pdf. [Retrieved May 17, 2018].

Narasiman et al., "Improving GPU Performance Via Large Warps and Two-Level Warp Scheduling", Proceedings of the 44th Annual IEEE/ACM International Symposium on Microarchitecture, Dec. 3, 2011, pp. 308-317, https://users.ece.cmu.edu/~omutlu/pub/large-gpu-warps_micro11.pdf. [Retrieved May 17, 2018].

Park et al., "Chimera: Collaborative Preemption for Multitasking on a Shared GPU", Proceedings of the 20th International Conference on Architectural Support for Programming Languages and Operating Systems, Mar. 14, 2015, pp. 593-606, http://cccp.eecs.umich.edu/papers/jasonjk-asplos15.pdf. [Retrieved May 17, 2018].

Rogers et al., "Cache-Conscious Wavefront Scheduling". Proceedings of the 45th Annual IEEE/ACM International Symposium on Microarchitecture, Dec. 1, 2012, 12 pages, https://www.ece.ubc.ca/~aamodt/papers/tgrogers.micro2012.pdf. [Retrieved May 17, 2018].

Rogers et al., "Divergence-Aware Warp Scheduling", Proceedings of the 46th Annual IEEE/ACM International Symposium on Microarchitecture, Dec. 7, 2013, pp. 99-110, https://www.ece.ubc.ca/~aamodt/papers/tgrogers.micro2013.pdf. [Retrieved May 17, 2018].

Wang et al., "Exploiting Concurrent Kernel Execution on Graphic Processing Units", International Conference on High Performance Computing and Simulation, Aug. 2011, pp. 24-32.

Puthoor et al., U.S. Appl. No. 15/993,061, entitled "Multi-Kernel Wavefront Scheduler", filed May 30, 2018, 31 pages.

Communication pursuant to Article 94(3) EPC in European Application No. 17159105.0, dated Jul. 2, 2018, 7 pages.

Non-Final Office Action in U.S. Appl. No. 15/607,991, dated Apr. 2, 2019, 10 pages.

* cited by examiner

*First Mode*

| Work Items | | | Instruction |
|---|---|---|---|
| $W_N$ | ••• | $W_{2N-1}$ | Instruction 415D |
| $W_0$ | ••• | $W_{N-1}$ | Instruction 415D |
| $W_N$ | ••• | $W_{2N-1}$ | Instruction 415C |
| $W_0$ | ••• | $W_{N-1}$ | Instruction 415C |
| $W_N$ | ••• | $W_{2N-1}$ | Instruction 415B |
| $W_0$ | ••• | $W_{N-1}$ | Instruction 415B |
| $W_N$ | ••• | $W_{2N-1}$ | Instruction 415A |
| $W_0$ | ••• | $W_{N-1}$ | Instruction 415A |

*Second Mode*

| Work Items | | | Instruction |
|---|---|---|---|
| $W_N$ | • • • | $W_{2N-1}$ | Instruction 415D |
| $W_N$ | • • • | $W_{2N-1}$ | Instruction 415C |
| $W_N$ | • • • | $W_{2N-1}$ | Instruction 415B |
| $W_N$ | • • • | $W_{2N-1}$ | Instruction 415A |
| $W_0$ | • • • | $W_{N-1}$ | Instruction 415D |
| $W_0$ | • • • | $W_{N-1}$ | Instruction 415C |
| $W_0$ | • • • | $W_{N-1}$ | Instruction 415B |
| $W_0$ | • • • | $W_{N-1}$ | Instruction 415A |

INDICATING INSTRUCTION SCHEDULING MODE FOR PROCESSING WAVEFRONT PORTIONS

BACKGROUND

Description of the Related Art

A graphics processing unit (GPU) is a complex integrated circuit that is configured to perform graphics-processing tasks. For example, a GPU can execute graphics-processing tasks required by an end-user application, such as a video-game application. GPUs are also increasingly being used to perform other tasks which are unrelated to graphics. The GPU can be a discrete device or can be included in the same device as another processor, such as a central processing unit (CPU).

In many applications, such as graphics processing in a GPU, a sequence of work-items, which can also be referred to as threads, are processed so as to output a final result. In many modern parallel processors, for example, processors within a single instruction multiple data (SIMD) core synchronously execute a set of work-items. A plurality of identical synchronous work-items that are processed by separate processors are referred to as a wavefront or warp.

During processing, one or more SIMD cores concurrently execute multiple wavefronts. Execution of the wavefront terminates when all work-items within the wavefront complete processing. Each wavefront includes multiple work-items that are processed in parallel, using the same set of instructions. In some cases, the number of work-items in a wavefront does not match the number of execution units of the SIMD cores. In one embodiment, each execution unit of a SIMD core is an arithmetic logic unit (ALU). When the number of work-items in a wavefront does not match the number of execution units of the SIMD cores, determining how to schedule instructions for execution can be challenging.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for processing variable wavefront sizes on a processor are disclosed. When operating in a first mode, the processor executes the same instruction on multiple portions of a wavefront before proceeding to the next instruction of the shader program. When operating in a second mode, the processor executes a set of instructions on a first portion of a wavefront. In the second mode, when the processor finishes executing the set of instructions on the first portion of the wavefront, the processor executes the set of instructions on a second portion of the wavefront, and so on until all portions of the wavefront have been processed. Then, the processor continues executing subsequent instructions of the shader program.

In one embodiment, an indication is declared within the code sequence, with the indication specifying which mode to utilize for a given region of the program. In another embodiment, a compiler generates the indication when generating executable code, with the indication specifying the processor operating mode. In another embodiment, the processor includes a control unit which determines the processor operating mode.

Figure 1:
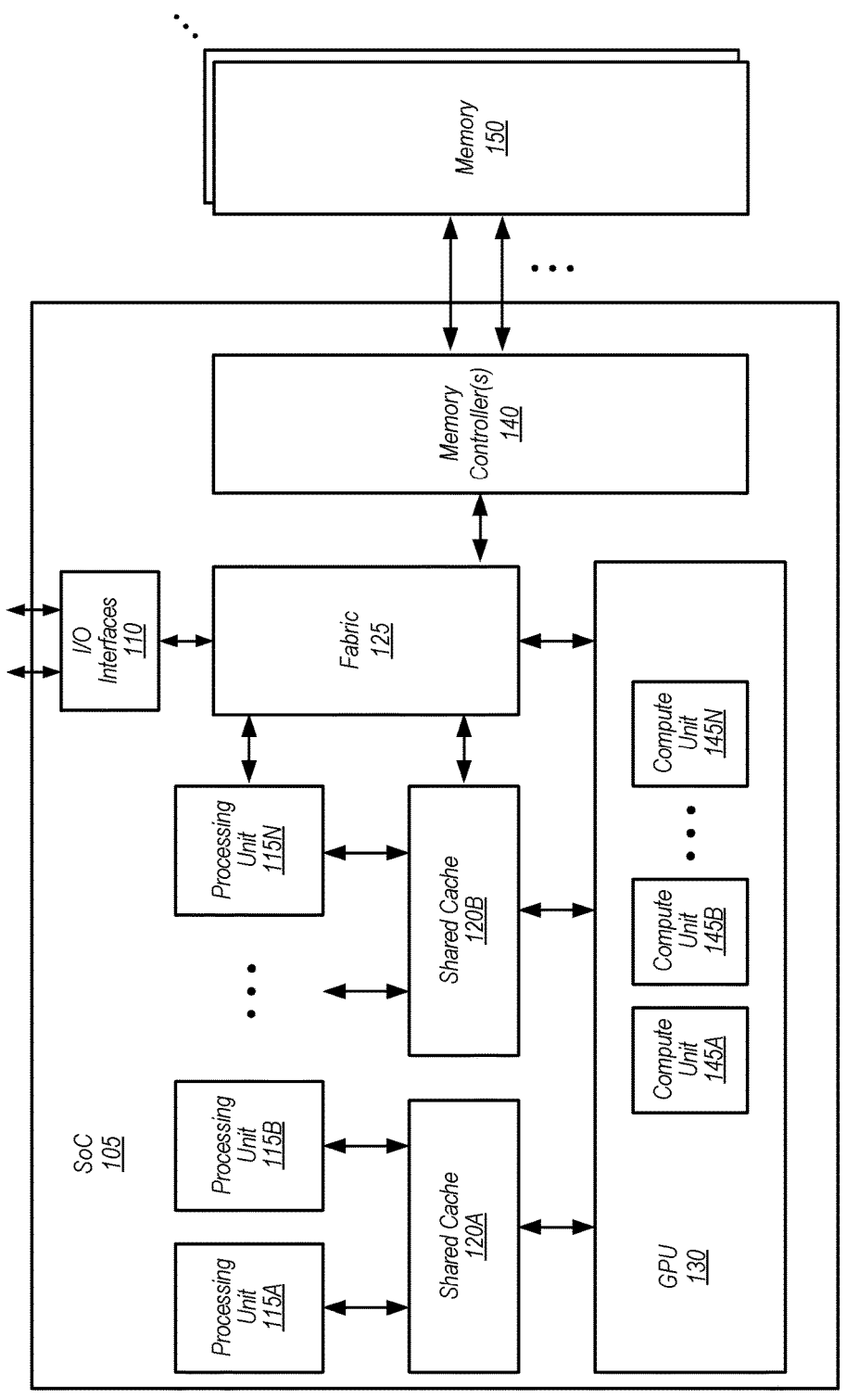
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 115A-N, input/output (I/O) interfaces 110, shared caches 120A-B, fabric 125, graphics processing unit (GPU) 130, and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., application specific integrated circuit (ASIC), field programmable gate array (FPGA), digital signal processor (DSP)). Processing units 115A-N are coupled to shared caches 120A-B and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs.

GPU 130 includes at least compute units 145A-N which are representative of any number and type of compute units that are used for graphics or general-purpose processing.

Compute units 145A-N can also be referred to as "shader arrays", "shader engines", "single instruction multiple data (SIMD) units", or "SIMD cores". Each compute unit 145A-N includes a plurality of execution units. GPU 130 is coupled to shared caches 120A-B and fabric 125. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

GPU 130 is configured to receive instructions of a shader program and wavefronts for execution. In one embodiment, GPU 130 is configured to operate in different modes. In one embodiment, the number of work-items in each wavefront is greater than the number of execution units in GPU 130.

In one embodiment, GPU 130 schedules a first instruction for execution on first and second portions of a first wavefront prior to scheduling a second instruction for execution on the first portion of the first wavefront responsive to detecting a first indication. GPU 130 follows this pattern for the other instructions of the shader program and for other wavefronts as long as the first indication is detected. It is noted that "scheduling an instruction" can also be referred to as "issuing an instruction". Depending on the embodiment, the first indication can be specified in software, or the first indication can be generated by GPU 130 based on one or more operating conditions. In one embodiment, the first indication is a command for GPU 130 to operate in a first mode.

In one embodiment, GPU 130 schedules the first instruction and the second instruction for execution on the first portion of the first wavefront prior to scheduling the first instruction for execution on the second portion of the first wavefront responsive to not detecting the first indication. GPU 130 follows this pattern for the other instructions of the shader program and for other wavefronts as long as the first indication is not detected.

I/O interfaces 110 are coupled to fabric 125, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 145A-N. In some embodiments, SoC 105 includes shared caches 120A-B that are utilized by processing units 115A-N and compute units 145A-N. In one embodiment, caches 120A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
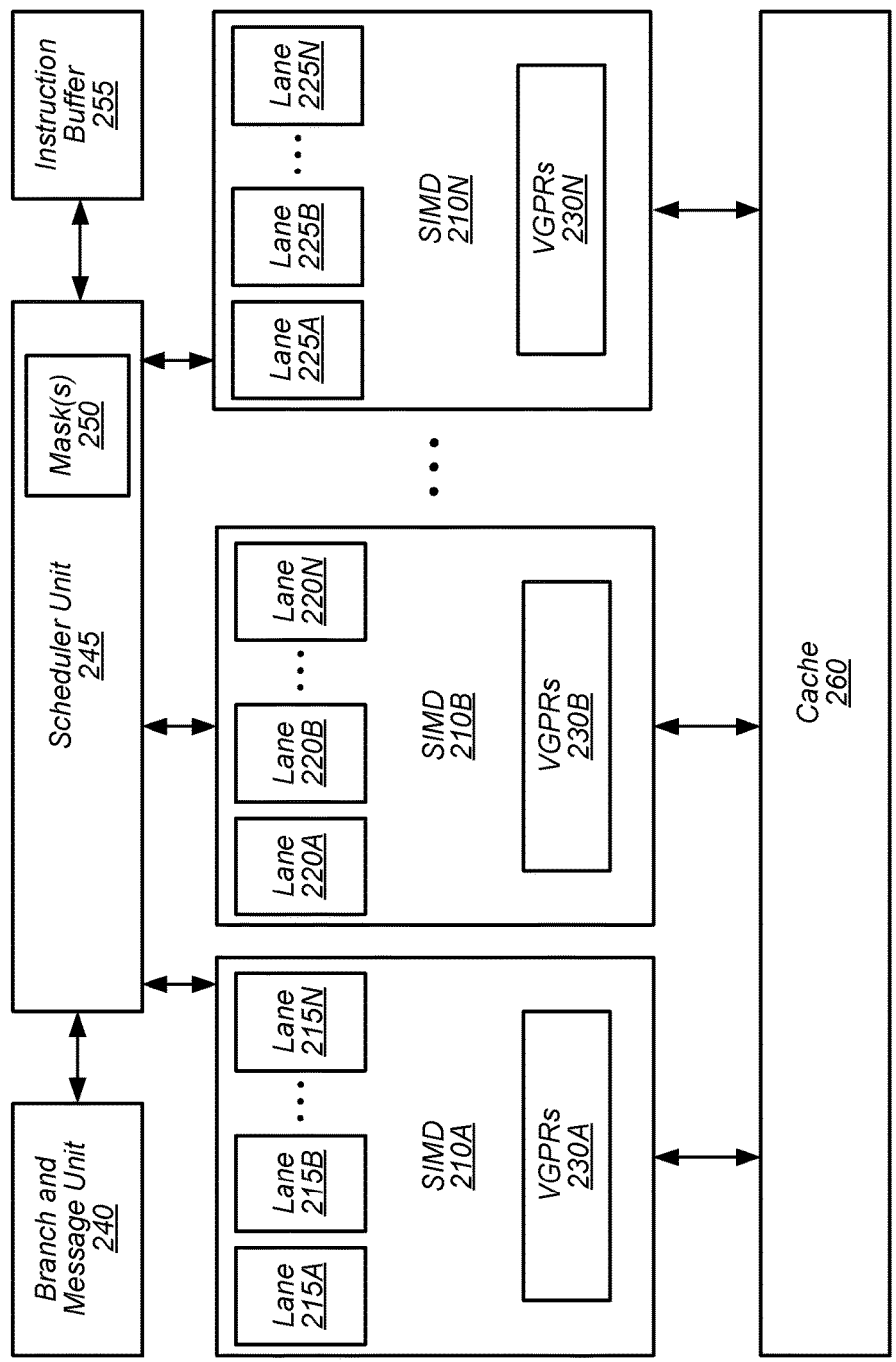
FIG. 2 is a block diagram of one embodiment of a GPU.

Turning now to FIG. 2, a block diagram of one embodiment of a graphics processing unit (GPU) 200 is shown. In one embodiment, GPU 200 includes at least SIMDs 210A-N, branch and message unit 240, scheduler unit 245, instruction buffer 255, and cache 260. It is noted that GPU 200 can also include other logic which is not shown in FIG. 2 to avoid obscuring the figure. It is also noted that other processors (e.g., FPGAs, ASICs, DSPs) can include the circuitry shown in GPU 200.

In one embodiment, GPU 200 is configured to operate in different modes to process instructions of a shader program on wavefronts of different sizes. GPU 200 utilizes a given mode to optimize performance, power consumption, and/or other factors depending on the type of workload being processed and/or the number of work-items in each wavefront. In one embodiment, each wavefront includes a number of work-items which is greater than the number of lanes 215A-N, 220A-N, and 225A-N in SIMDs 210A-N. In this embodiment, GPU 200 processes the wavefronts differently based on the operating mode of GPU 200. In another embodiment, GPU 200 processes the wavefronts differently based on one or more detected conditions. Each lane 215A-N, 220A-N, and 225A-N of SIMDs 210A-N can also be referred to as an "execution unit".

In one embodiment, GPU 200 receives a plurality of instructions for a wavefront with a number of work-items which is greater than the total number of lanes in SIMDs 210A-N. In this embodiment, GPU 200 executes a first instruction on multiple portions of a wavefront before proceeding to the second instruction when GPU 200 is in a first mode. GPU 200 continues with this pattern of execution for subsequent instructions for as long as GPU 200 is in the first mode. In one embodiment, the first mode can be specified by a software-generated declaration. If GPU 200 is in a second mode, then GPU 200 executes multiple instructions on a first portion of the wavefront before proceeding to the second portion of the wavefront. When GPU 200 is in the second mode, GPU 200 shares a portion of vector general purpose registers (VGPRs) 230A-N between different portions of the wavefront. Additionally, when GPU 200 is in the second mode, if an execution mask of mask(s) 250 indicates that a given portion of the wavefront is temporarily masked out, then GPU 200 does not execute the instruction for the given portion of the wavefront.

In another embodiment, if the wavefront size is greater than the number of SIMDs, GPU 200 determines the cache miss rate of cache 260 for the program. If the cache miss rate is less than a threshold, then GPU 200 executes a first instruction on multiple portions of a wavefront before proceeding to the second instruction. GPU 200 continues with this pattern of execution for subsequent instructions for as long as the cache miss rate is determined or predicted to be less than the threshold. The threshold can be specified as a number of bytes, as a percentage of cache 260, or as any other suitable metric. If the cache miss rate is greater than or equal to the threshold, then GPU 200 executes multiple instructions on a first portion of the wavefront before executing the multiple instructions on the second portion of the wavefront. Additionally, if the cache miss rate is greater than or equal to the threshold, GPU 200 shares a portion of vector general purpose registers (VGPRs) 230A-N between different portions of the wavefront, and GPU 200 skips instructions for the given portion of the wavefront if the execution mask indicates the given portion is masked out.

It is noted that the letter "N" when displayed herein next to various structures is meant to generically indicate any number of elements for that structure (e.g., any number of SIMDs 210A-N). Additionally, different references within FIG. 2 that use the letter "N" (e.g., SIMDs 210A-N and lanes 215A-N) are not intended to indicate that equal numbers of the different elements are provided (e.g., the number of SIMDs 210A-N can differ from the number of lanes 215A-N).

Figure 3:
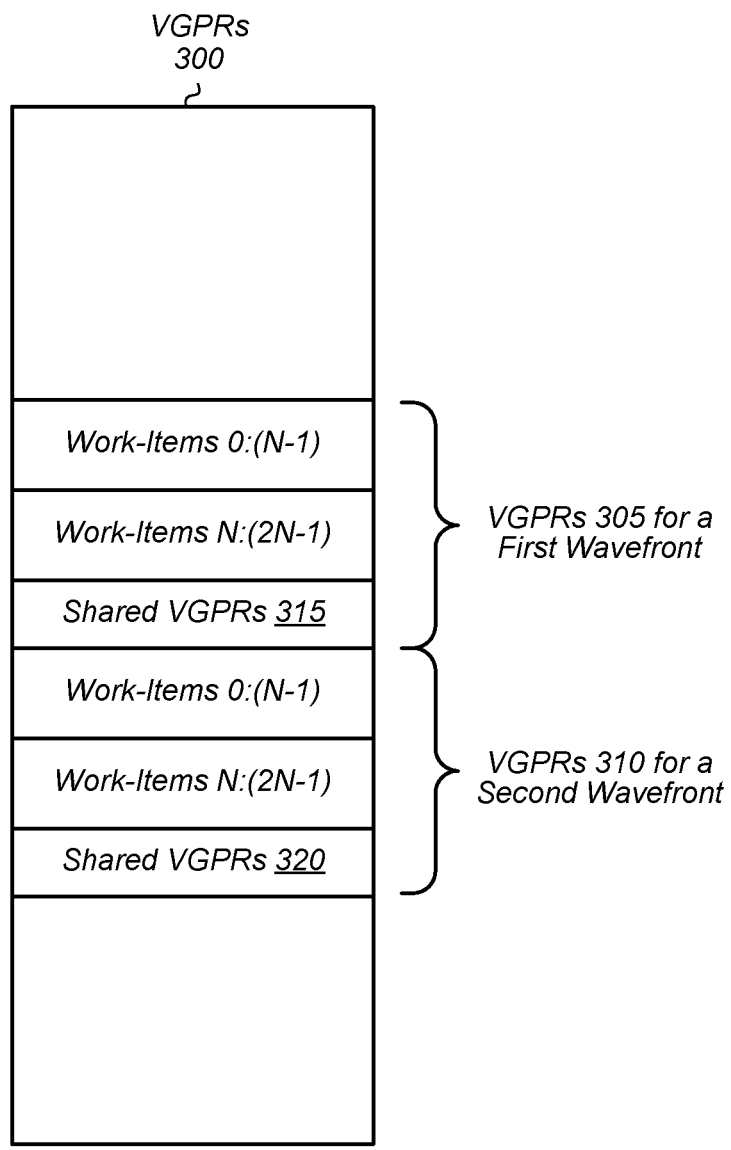
FIG. 3 is a block diagram of one embodiment of a set of vector general purpose registers (VGPRs).

Referring now to FIG. 3, a block diagram of one embodiment of a set of vector general purpose registers (VGPRs) 300 is shown. In one embodiment, VGPRs 300 are included in SIMDs 210A-N of GPU 200 (of FIG. 2). VGPRs 300 can include any number of registers, depending on the embodiment.

As shown in FIG. 3, VGPRs 300 includes VGPRs 305 for a first wavefront, VGPRs 310 for a second wavefront, and any number of other VGPRs for other numbers of wavefronts. It is assumed for the purposes of this discussion that the first and second wavefronts have 2*N number of work-items, with N being a positive integer, and with N varying from embodiment to embodiment. In one embodiment, N is equal to 32. VGPRs 305 includes a region with private VGPRs and a shared VGPR region 315. Similarly, VGPRs 310 includes a region with private VGPRs and a shared VGPR region 320.

In one embodiment, if the host GPU (e.g., GPU 200) is in a first mode, then shared VGPRs 315 and shared VGPRs 310 are not shared between different portions of the first and second wavefronts, respectively. However, when the host GPU is in a second mode, then shared VGPRs 315 and shared VGPRs 310 are shared between different portions of the first and second wavefronts, respectively. In other embodiments, the implementation of sharing or not sharing is based on the detection of a first indication rather than being based on a first mode or second mode. The first indication can be generated by software, generated based on cache miss rate, or generated based on one or more other operating conditions.

Figure 4:
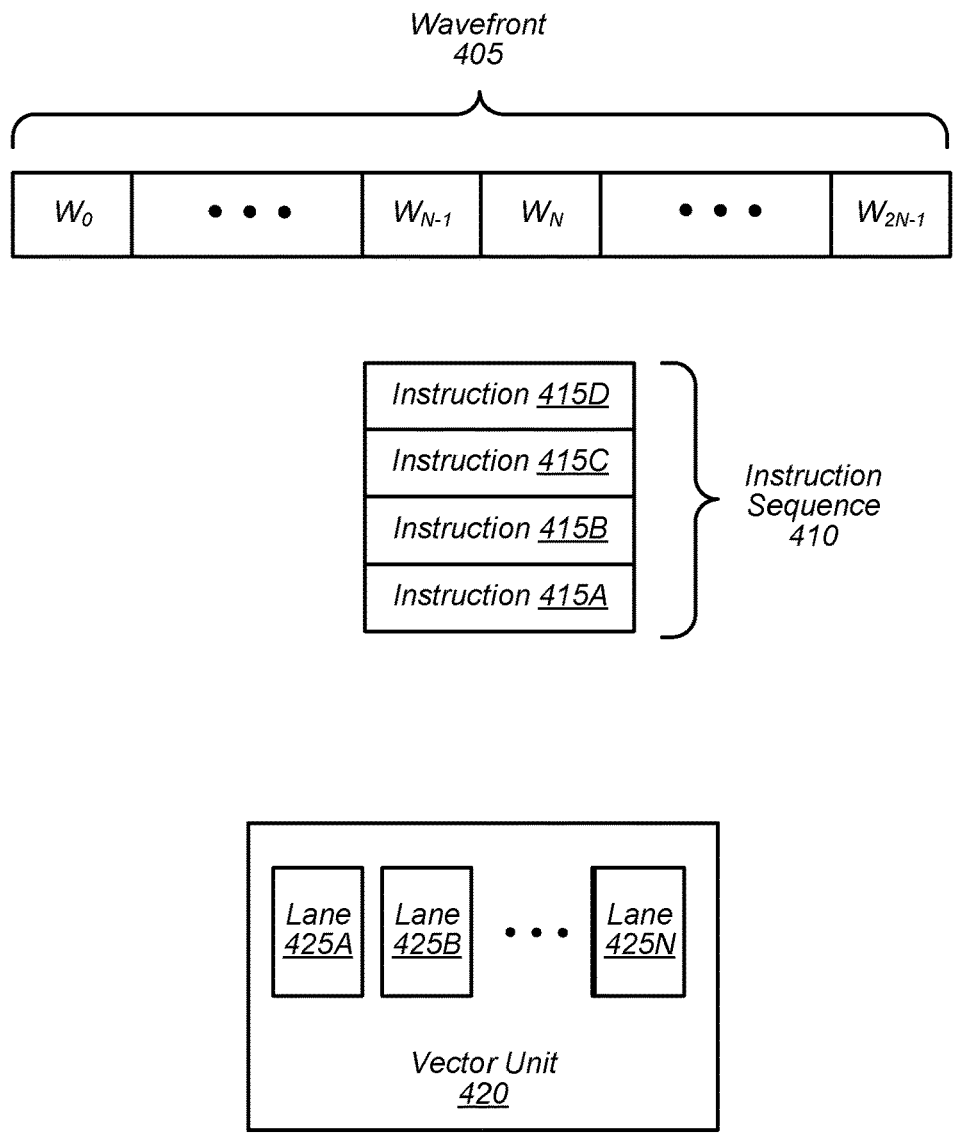
FIG. 4 illustrates one embodiment of an example wavefront and an example instruction sequence.

Turning now to FIG. 4, one embodiment of an example wavefront 405 and an example instruction sequence 410 are shown. Wavefront 405 is intended to illustrate one example of a wavefront in accordance with one embodiment. Wavefront 405 includes 2*N number of work-items, wherein "N" is a positive integer, and wherein "N" is the number of lanes 425A-N in vector unit 420. Vector unit 420 can also be referred to as a SIMD unit or a parallel processor. The first portion of wavefront 405 includes work-items $W_0$ through $W_{N-1}$, and the second portion of wavefront 405 includes work-items $W_N$ through $W_{2N-1}$. A single portion of wavefront 405 is intended to execute on lanes 425A-N of vector unit 420 in a given instruction cycle. In other embodiments, wavefront 405 can include other numbers of portions.

In one embodiment, N is 32, and the number of work-items per wavefront is 64. In other embodiments, N can be other values. In the embodiment when N is 32, vector unit 420 also includes 32 lanes which are shown as lanes 425A-N. In other embodiments, vector unit 420 can include other numbers of lanes.

Instruction sequence 410 is illustrative of one example of an instruction sequence. As shown in FIG. 4, instruction sequence 410 includes instructions 415A-D, which are representative of any number and type of instructions of a shader program. It should be assumed for the purposes of this discussion that instruction 415A is the first instruction of instruction sequence 410, with instruction 415B the second instruction, instruction 415C the third instruction, and instruction 415D the fourth instruction. In other embodiments, an instruction sequence can have other numbers of instructions. Wavefront 405, instruction sequence 410, and vector unit 420 are reused during the discussion that continues for FIG. 5 and FIG. 6 below.

Figure 5:
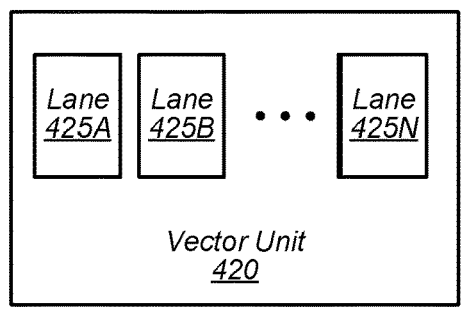
FIG. 5 illustrates a diagram of one embodiment of a first mode of operation for a processor.

Referring now to FIG. 5, a diagram of one embodiment of a first mode of operation for a processor is shown. The discussion of FIG. 5 is a continuation of the discussion regarding FIG. 4. In one embodiment, the size of a wavefront is twice the size of vector unit 420. In another embodiment, the size of a wavefront is an integer multiple of the size of vector unit 420. In these embodiments, a processor can implement different modes of operation for determining how to execute the work-items of the wavefront using vector unit 420.

In a first mode of operation, each instruction is executed on different subsets of the wavefront before the next instruction is executed on the different subsets. For example, instruction 415A is executed for the first half (i.e., work-items $W_0$ through $W_{N-1}$) of the wavefront during a first instruction cycle on lanes 425A-N of vector unit 420, and then instruction 415A is executed for the second half (i.e., work-items $W_N$ through $W_{2N-1}$) of the first wavefront during a second instruction cycle on lanes 425A-N. For example, during the first instruction cycle, work-item $W_0$ can execute on lane 425A, work-item $W_1$ can execute on lane 425B, and so on.

Then, instruction 415B is executed for the first half of the wavefront during a third instruction cycle on lanes 425A-N, and then instruction 415B is executed for the second half of the wavefront during a fourth instruction cycle on lanes 425A-N. Next, instruction 415C is executed for the first half of the wavefront during a fifth instruction cycle on lanes 425A-N, and then instruction 415C is executed for the second half of the wavefront during a sixth instruction cycle on lanes 425A-N. Then, instruction 415D is executed for the first half of the wavefront on lanes 425A-N of vector unit 420 during a seventh instruction cycle on lanes 425A-N, and then instruction 415D is executed for the second half of the wavefront on lanes 425A-N of vector unit 420 during an eighth instruction cycle on lanes 425A-N. For the purposes of this discussion, it can be assumed that the second instruction cycle follows the first instruction cycle, the third instruction cycle follows the second instruction cycle, and so on.

Figure 6:
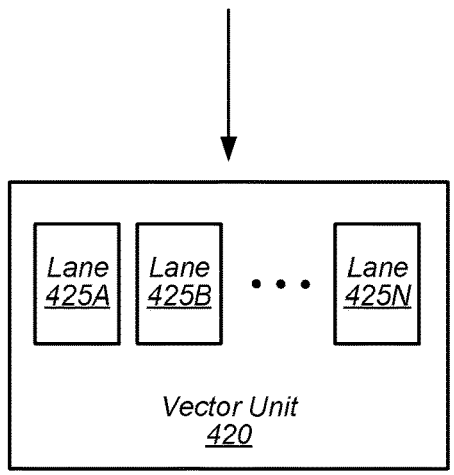
FIG. 6 illustrates a diagram of one embodiment of a second mode of operation for a processor.

Turning now to FIG. 6, a diagram of one embodiment of a second mode of operation for a processor is shown. The discussion of FIG. 6 a continuation of the discussion regarding FIG. 5. In the second mode of operation, the entire instruction sequence 410 is executed on the same portion of the wavefront before the entire instruction sequence 410 is executed on the next portion of the wavefront.

For example, in a first instruction cycle, instruction 415A is executed for the first half (i.e., work-items $W_0$ through $W_{N-1}$) of the wavefront on lanes 425A-N of vector unit 420.

Then, in a second instruction cycle, instruction 415B is executed for the first half of the wavefront on lanes 425A-N. Next, in a third instruction cycle, instruction 415C is executed for the first half of the wavefront on lanes 425A-N. Then, in a fourth instruction cycle, instruction 415D is executed for the first half of the wavefront on lanes 425A-N.

Next, instruction sequence 410 is executed on the second half of the wavefront. Accordingly, in a fifth instruction cycle, instruction 415A is executed for the second half (i.e., work-items $W_N$ through $W_{2N-1}$) of the wavefront on lanes 425A-N of vector unit 420. Then, in a sixth instruction cycle, instruction 415B is executed for the second half of the wavefront on lanes 425A-N. Next, in a seventh instruction cycle, instruction 415C is executed for the second half of the wavefront on lanes 425A-N. Then, in an eighth instruction cycle, instruction 415D is executed for the second half of the wavefront on lanes 425A-N.

In another embodiment, if a wavefront had 4*N work-items, instruction sequence 410 could be executed on the first quarter of the wavefront, then instruction sequence 410 could be executed on the second quarter of the wavefront, followed by the third quarter and then the fourth quarter of the wavefront. Other wavefronts of other sizes and/or vector units with other numbers of lanes could be utilized in a similar manner for the second mode of operation.

Figure 7:
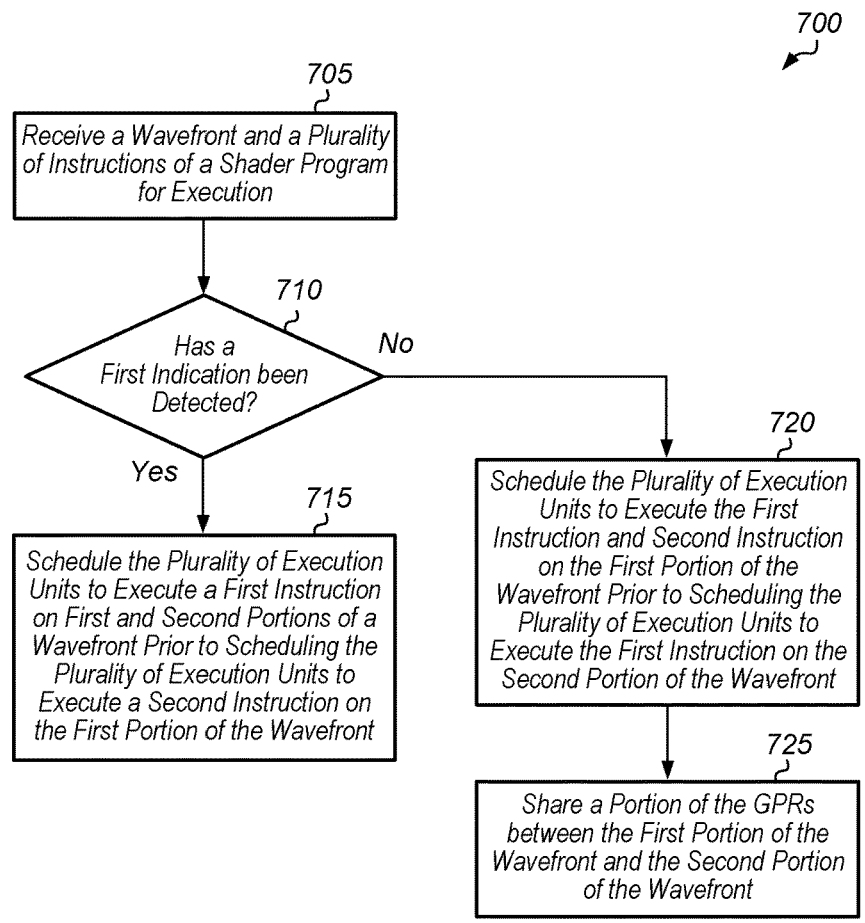
FIG. 7 is a generalized flow diagram illustrating one embodiment of a method for scheduling instructions on a processor.
Figure 8:
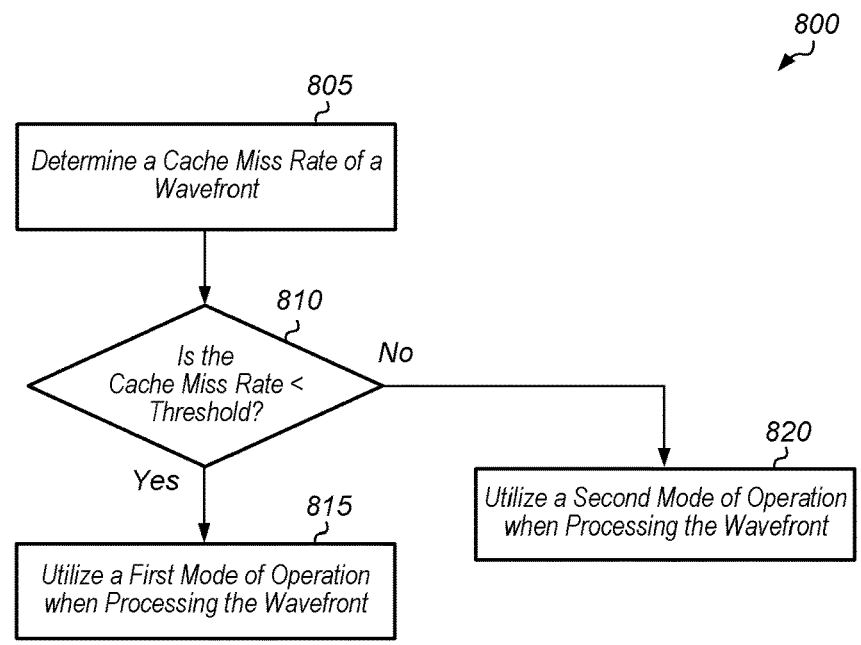
FIG. 8 is a generalized flow diagram illustrating one embodiment of a method for determining which operating mode to use in a parallel processor.
Figure 9:
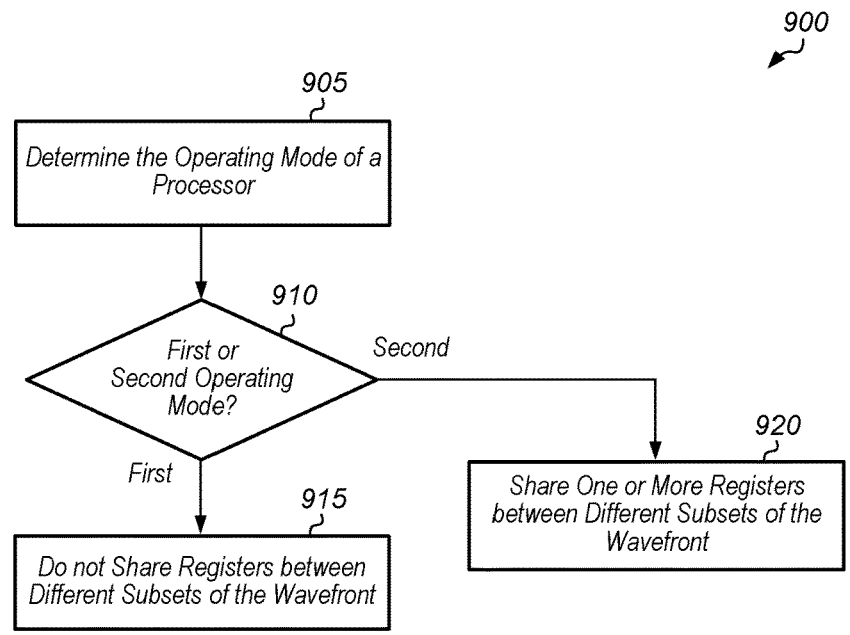
FIG. 9 is a generalized flow diagram illustrating one embodiment of a method for utilizing different operating modes for a parallel processor.

Referring now to FIG. 7, one embodiment of a method 700 for scheduling instructions on a processor is shown. For purposes of discussion, the steps in this embodiment and those of FIG. 8-9 are shown in sequential order. However, it is noted that in various embodiments of the described methods, one or more of the elements described are performed concurrently, in a different order than shown, or are omitted entirely. Other additional elements are also performed as desired. Any of the various systems, apparatuses, or computing devices described herein are configured to implement method 700.

A processor receives a wavefront and a plurality of instructions of a shader program for execution (block 705). In one embodiment, the processor includes at least a plurality of execution units, a scheduler, a cache, and a plurality of GPRs. In one embodiment, the processor is a GPU. In other embodiments, the processor is any of various other types of processors ((e.g., DSP, FPGA, ASIC, multi-core processor). In one embodiment, the number of work-items in the wavefront is greater than the number of execution units of the processor. For example, in one embodiment, the wavefront includes 64 work-items and the processor includes 32 execution units. In this embodiment, the number of work-items in the wavefront is equal to twice the number of execution units. In other embodiments, the wavefront can include other numbers of work-items and/or the processor can include other numbers of execution units. In some cases, the processor receives a plurality of wavefronts for execution. In these cases, method 700 can be implemented multiple times for the multiple wavefronts.

Next, the processor determines if a first indication has been detected (conditional block 710). In one embodiment, the first indication is a setting or parameter declared within a software instruction, with the setting or parameter specifying the operating mode for the processor to utilize. In another embodiment, the first indication is generated based on a cache miss rate of the wavefront. In other embodiments, other types of indications are possible and are contemplated.

If the first indication is detected (conditional block 710, "yes" leg), then the processor schedules the plurality of execution units to execute a first instruction on first and second portions of a wavefront prior to scheduling the plurality of execution units to execute a second instruction on the first portion of the wavefront (block 715). The processor can follow this same pattern of scheduling instruction for the remainder of the plurality of instructions, as long as the first indication is detected. If the first indication is not detected (conditional block 710, "no" leg), then the processor schedules the plurality of execution units to execute the first instruction and the second instruction on the first portion of the wavefront prior to scheduling the plurality of execution units to execute the first instruction on the second portion of the wavefront (block 720). The processor can follow this same pattern of scheduling instruction for the remainder of the plurality of instructions, as long as the first indication is not detected. Also, the processor shares a portion of the GPRs between the first portion of the wavefront and the second portion of the wavefront if the first indication is not detected (block 725). After blocks 715 and 725, method 700 ends.

Turning now to FIG. 8, one embodiment of a method 800 for determining which operating mode to use in a parallel processor is shown. A control unit of a processor determines a cache miss rate of a wavefront (block 805). Depending on the embodiment, the control unit can determines the cache miss rate of a portion of the wavefront or of the entirety of the wavefront in block 805. Depending on the embodiment, the control unit is implemented using any suitable combination of hardware and/or software. In one embodiment, the control unit predicts a cache miss rate of the wavefront. In another embodiment, the control unit receives an indication generated by software, with the indication specifying the cache miss rate of the wavefront. Next, the control unit determines if the cache miss rate of the wavefront is less than a threshold (conditional block 810). Alternatively, if the control unit receives an indication generated by software, the indication can specify if the cache miss rate is less than the threshold. In one embodiment, the threshold is programmable. In another embodiment, the threshold is predetermined.

If the cache miss rate of the wavefront is less than a threshold (conditional block 810, "yes" leg), then the processor utilizes a first mode of operation when processing the wavefront (block 815). In one embodiment, the first mode of operation involves issuing each instruction on all portions of the wavefront before moving on to the next instruction in the shader program. If the cache miss rate of the wavefront is greater than or equal to the threshold (conditional block 810, "no" leg), then the processor utilizes a second mode of operation when processing the wavefront (block 820). In one embodiment, the second mode of operation involves executing a set of instructions on a first portion of the wavefront, then executing the same set of instructions on a second portion of the wavefront, and so on, until all portions of the wavefront have been processed. After blocks 815 and 820, method 800 ends.

Referring now to FIG. 9, another embodiment of a method 900 for utilizing different operating modes for a parallel processor is shown. A control unit of a processor determines the operating mode of the processor (block 905). Depending on the embodiment, the control unit is implemented using any suitable combination of hardware and/or software. The criteria the control unit utilizes to determine which operating mode to select can vary from embodiment to embodiment. One example of criteria that can be utilized is described in FIG. 8 in the discussion regarding method 800. Other examples of criteria that can be utilized for selecting the processor operating mode are possible and are contemplated.

If the control unit selects a first operating mode (conditional block 910, "first" leg), then the processor does not share registers between different subsets of the wavefront being processed by the processor (block 915). Otherwise, if the control unit selects a second operating mode (conditional block 910, "second" leg), then the control unit shares one or more registers between different subsets of the wavefront being processed by the processor (block 920). For example, in one embodiment, sharing registers involves the processor using a shared portion of a register file for a first portion of a wavefront for a first set of instructions. Then, the processor reuses the shared portion of the register file for a second portion of the wavefront. If the wavefront has more than two portions, then the processor reuses the shared portion of the register file for the additional portions of the wavefront. After block 920, method 900 ends.

It is noted that in some embodiments, a processor can have more than two operating modes. In these embodiments, conditional block 910 can be applied such that a first subset (e.g., first mode, third mode, seventh mode) of operating modes follow the "first" leg and a second subset (e.g., second mode, fourth mode, fifth mode, sixth mode) of operating modes follow the "second" leg shown in FIG. 7. Alternatively, in another embodiment, the size of the portion of the register file that is shared can vary according to different operating modes. For example, for a second mode, a first number of registers are shared, for a third mode, a second number of registers are shared, for a fourth mode, a third number of GPRs are shared, and so on.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a plurality of execution units; and
a scheduler configured to schedule the plurality of execution units to execute:
a first instruction on a first portion of a wavefront in a first instruction cycle;
the first instruction on a second portion of the wavefront in a second instruction cycle prior to scheduling a second instruction for execution on the first portion of the wavefront, responsive to detecting a first indication; and
the second instruction on the first portion of the wavefront in the second instruction cycle prior to scheduling the first instruction for execution on the second portion of the wavefront, responsive to not detecting the first indication.

2. The processor as recited in claim 1, wherein the first indication is a parameter declared within a software instruction.

3. The processor as recited in claim 1, wherein the processor is configured to operate in a plurality of operating modes, and wherein the first indication is a command for the processor to operate in a first mode.

4. The processor as recited in claim 3, wherein the processor further comprises a plurality of general purpose registers (GPRs), and wherein the processor is configured to share one or more GPRs between the first portion of the wavefront and the second portion of the wavefront responsive to operating in a second mode.

5. The processor as recited in claim 1, wherein the processor further comprises a cache and is configured to:
determine a cache miss rate of the wavefront; and
generate the first indication responsive to determining the cache miss rate of the wavefront is less than a threshold.

6. The processor as recited in claim 1, wherein a number of work-items in the first portion and the second portion of the wavefront is greater than a number of the plurality of execution units.

7. The processor as recited in claim 1, wherein each of the first instruction and the second instruction is included in an instruction sequence, and the first indication is declared prior to the scheduler issuing any instructions of the instruction sequence.

8. A method for use in a computing device, the method comprising:
scheduling a plurality of execution units to execute:
a first instruction on a first portion of a wavefront in a first instruction cycle;
the first instruction on a second portion of the wavefront in a second instruction cycle prior to scheduling a second instruction for execution on the first portion of the wavefront, responsive to detecting a first indication; and
the second instruction on the first portion of a wavefront in the second instruction cycle prior to scheduling the first instruction on the second portion of the wavefront, responsive to not detecting the first indication.

9. The method as recited in claim 8, wherein the first indication is a parameter declared within a software instruction.

10. The method as recited in claim 8, wherein the first indication is a command for a processor to operate in a first mode.

11. The method as recited in claim 10, further comprising sharing one or more general purpose registers (GPRs) between the first portion of the wavefront and the second portion of the wavefront responsive to operating in a second mode.

12. The method as recited in claim 8, further comprising:
determining a cache miss rate of the wavefront; and
generating the first indication responsive to determining the cache miss rate of the wavefront is less than a threshold.

13. The method as recited in claim 8, wherein a number of work-items in the first portion and the second portion of the wavefront is greater than a number of the plurality of execution units.

14. The method as recited in claim 8, wherein each of the first instruction and the second instruction is included in an instruction sequence, and the first indication is declared prior to issuing any instructions of the instruction sequence.

15. A system comprising:
a memory; and
a processor comprising:
- a plurality of execution units; and
- a scheduler configured to schedule the plurality of execution units to execute:
  - a first instruction on a first portion of a wavefront in a first instruction cycle;
  - the first instruction on a second portion of the wavefront in a second instruction cycle prior to scheduling a second instruction for execution on the first portion of the wavefront, responsive to detecting a first indication; and
  - the second instruction on the first portion of a wavefront in the second instruction cycle prior to scheduling the first instruction on the second portion of the wavefront, responsive to not detecting the first indication.

16. The system as recited in claim 15, wherein the first indication is a parameter declared within a software instruction.

17. The system as recited in claim 16, wherein a number of work-items in the first portion and the second portion of the wavefront is greater than a number of the plurality of execution units.

18. The system as recited in claim 15, wherein the processor is configured to operate in a plurality of operating modes, and wherein the first indication is a command for the processor to operate in a first mode.

19. The system as recited in claim 18, wherein the processor further comprises a plurality of general purpose registers (GPRs), and wherein the processor is configured to share one or more GPRs between the first portion of the wavefront and the second portion of the wavefront responsive to operating in a second mode.

20. The system as recited in claim 15, wherein the processor further comprises a cache, wherein the processor is configured to:
- determine a cache miss rate of the wavefront; and
- generate the first indication responsive to determining the cache miss rate of the wavefront is less than a threshold.

* * * * *